United States Patent [19]

Tomiyama

[11] 3,907,726

[45] Sept. 23, 1975

[54] BIOLOGICALLY DISINTEGRABLE RESIN MOLDING COMPRISING CARBOXYMETHYL CELLULOSE AND INORGANIC FILLER

[76] Inventor: Shinichi Tomiyama, No. 14-2, Onigoe 1-chome, Ichikawa, Chiba, Japan

[22] Filed: Mar. 19, 1973

[21] Appl. No.: 342,676

[30] Foreign Application Priority Data
Mar. 24, 1972 Japan.............................. 47-29530

[52] U.S. Cl. ............ 260/17 R; 260/8; 260/17.4 CL; 260/17.4 ST; 260/17.5; 260/42.13; 260/42.51; 260/DIG. 43
[51] Int. Cl............................................. C08b 21/32
[58] Field of Search.... 260/17, 8, 17.4 ST, 17.4 CL, 260/DIG. 43

[56] References Cited
UNITED STATES PATENTS
3,642,761  2/1972  Ohira et al......................... 260/93.7
3,647,111  3/1972  Stager et al........................... 260/38

FOREIGN PATENTS OR APPLICATIONS
722,589  11/1965  Canada........................ 260/DIG. 43

OTHER PUBLICATIONS

Chem. Tech., July 1971, "The Prospects for Biodegradable Plastics," F. Rodriguez, pp. 409–410.

Primary Examiner—Morris Liebman
Assistant Examiner—Edward Woodberry
Attorney, Agent, or Firm—Woodhams, Blanchard and Flynn

[57] ABSTRACT

A plastic molding made of a composition consisting of a thermoplastic resin mixed with an organic substance which is easily assimilable by microorganisms so that the molding becomes fragile and disintegrates with the passage of a fixed period of time.

7 Claims, No Drawings

BIOLOGICALLY DISINTEGRABLE RESIN MOLDING COMPRISING CARBOXYMETHYL CELLULOSE AND INORGANIC FILLER

BACKGROUND OF THE INVENTION

1. Field of the Invention

The present invention relates to a thermoplastic resin molding which disintegrates biologically.

2. Description of the Prior Art

General characteristics of thermoplastic resins are the moldability thereof and the durability of the resulting moldings. However, with the increase in the use of throw-away plastic articles, said durability has become a very serious obstacle to the disposal of waste articles.

Besides, general thermoplastic resins are defective in that they are inflammable and are apt to give forth poisonous gases in abundance during combustion thereof, etc. With a view to coping with this defect, there have hitherto been conducted a variety of studies directed to controlling said inflammability by admixing these resins with a large quantity of inorganic fillers, and some of these studies have admittedly succeeded in producing resins of practical use. This notwithstanding, inasmuch as the high durability of said resins remains unchanged, the question of so-called rubbish disposal remains unsolved.

SUMMARY OF THE INVENTION

The present invention is intended to provide a thermoplastic resin molding which will retain the properties of the resin for a considerable period of time but will lose said properties and become disintegrable rapidly once it is discarded and allowed to disintegrate under natural conditions by leaving it outdoors intact or burying it in the ground or the like for a long time.

DESCRIPTION OF THE PREFERRED EMBODIMENTS

As the thermoplastic resin for use in the present invention, any of such substances as the so-called polyolefins including high density polyethylene, low density polyethylene, ethylene-vinyl acetate copolymer, polypropylene and ethylene-propylene copolymer, copolymers consisting of styrene and other monomers is applicable as long as it will not give forth any germicidal gas at the time of its decomposition. As a matter of course, it will do to employ a blend product consisting of two kinds of resins such as a composition of polyolefin and polyvinyl acetate, and, as will be understood from the embodiments below, a resin having a vinyl acetate component is a particularly preferable thermoplastic resin. As the inorganic filler for use in the present invention, any of such substances as the well known diatomaceous earth, calcium carbonate, white carbon, talc, clay, etc. as well as calcium sulfate hemihydrate, anhydrous calcium sulfate, calcium sulfite, etc. which have recently become the objects of public attention, are applicable, the amount of filler to be applied is in the range of approximately 40–90% by weight or thereabouts relative to the whole quantity of the composition, provided that said amount is desired to be enough to achieve the state in which fair portions of the inorganic filler come into a certain degree of contact with one another within said molding.

As the organic substance to be added to the resin in the present invention, there are varieties of substances such as starch, processed starch (e.g. starch processed with fat), mannitol, lactose, cellulose, lignin, carboxymethyl cellulose (CMC), casein, etc. These substances are shapeless or amorphous and particles of them are of extreme fineness. An attempt to add these substances to a synthetic resin has never been made with the only exception of employing certain organic substances as an anti-blocking material for films on occasion. In the present invention, molding was tried by adding these substances to the extent of 1 to 10%, preferably 3 to 8%, by weight relative to the whole quantity of the composition. As a result, it has been proved that addition of these substances does not hinder the moldability of the composition. This is an astonishing finding. Because all of these organic substances are easily assimilable with microorganisms, a molding made thereof, when discarded as rubbish, is likely to deteriorate and disintegrate. With this in view, said molding was subjected to the test of semicontinuous activated sludge method, soil burial test, moldculture test, etc., and, as a result, the expected effects were obtained to perfection. Besides, said tests also led to the finding of such characteristics of the molding that it scarcely changes its properties during the early stage of the tests but rapidly becomes fragile after the passage of time of a certain period. This means that said molding retains the characteristics of a plastic product for a fairly long time even when used under tolerably severe conditions but it is apt to become fragile when it is discarded.

The point of the present invention is as discussed above, but it will be understood that the common knowledge relating to the manufacture of thermoplastic resin moldings are of course applicable to the present invention. Said common knowledge includes, for instance, application of a plasticizer, softener, etc. according to the kind of the resin employed, addition of a coloring agent required, mineral substances, as a source of nutrition for microorganisms, such as ammonium sulfate, lithium chloride, copper sulfate, potassium iodide, nickel chloride, etc. and so forth, but such matters have no direct bearing on the essentials of the present invention, so that elucidation thereof may be dispensed with herein. A thing to be emphasized herein is the fact that to make a synthetic resin contain vinyl acetate as a component or an ingredient thereof, not as an additive therefor, is contributive to a remarkable enhancement of the effects of the present invention.

Hereunder will be given a further elucidation of the present invention by reference to various embodiments thereof.

EXAMPLE 1

A test piece (sheet) prepared by the use of a thoroughly kneaded mixture consisting of 30% (% by weight; the same will apply hereinafter) of a commercial high density polyethylene, 65% of anhydrous calcium sulfate and 5% of refined lignin powder was buried in the ground to thereby measure the changes of its strength with the passage of time. As a result, the lowering of the tensile strength of said test piece was only about 3% 100 days after burial, but attained 20% after 200 days, 35% after 300 days and 60% after 400 days. (The test method was in accordance with JIS; the same will apply hereinafter.)

The moldability of this resin was quite the same as that of a resin employing 70% of anhydrous calcium sulfate, and was suited for calendering process, injection molding process, etc.

EXAMPLE 2

The same test as in Example 1 was conducted by substituting starch for lignin used in Example 1. As a result, though the tensile strength of the test piece showed no change at 150 days after burial, it showed lowering by 30% after 300 days. Further, when the same test piece was merely dipped in water, its tensile strength showed no change even 200 days after, but it showed lowering by about 15% after 300 days.

EXAMPLE 3

The same test as in Example 2 was conducted by substituting a starch processed with palmitic acid for the starch used in Example 2. The result of the soil burial test of the test piece was almost the same as that in the preceding example, while in the case of the semicontinuous activated sludge method test (that is, a test in which the test piece was left standing outdoors after smearing an active sludge therein), the tensile strength of the test piece showed lowering by 50% after 400 days and by 65% after 500 days.

In this connection, in the case of the test piece used in Example 1, neither the result of the soil burial test nor the result of the semicontinuous activated sludge method showed any remarkable difference.

EXAMPLE 4

A test piece (sheet) prepared by the use of a thoroughly kneaded mixture consisting of 30% of a polyethylene (molecular weight: about 150,000), 65% of calcium sulfite and 5% of lactose was subjected to both the soil burial test and the semicontinuous activated sludge test. In the case of the former test, the tensile strength showed lowering by 55% after 300 days and by 70% after 500 days, while in the case of the latter test, the tensile strength showed lowering by 50% after 200 days and by 60% after 300 days. These showings verify that lactose is suited for the purpose of the present invention.

EXAMPLE 5

The same tests as in Example 4 were conducted by substituting mannitol for lactose used in Example 4. The degree of deterioration of the test piece 200 days after in both the soil burial test and the semicontinuous activated sludge method was practically the same as that in Example 4, but the speed of deterioration subsequent thereto was less. Nevertheless, mannitol is also considered suitable for the present invention.

EXAMPLE 6

The same tests as in Example 5 were conducted by applying pulverized fibrous material as the organic substance. On this occasion, the result of the soil burial test showed lowering of the tensile strength of the test piece by 50% after 200 days, while deterioration of the test piece after 200 days in the semicontinuous activated sludge method was trifling. It seems therefore that the pulverized fibrous material is of practical use only when the resulting molding is intended for a specific use.

EXAMPLE 7

Tests were conducted by the use of test pieces having the same compositions as those in the preceding three examples except for the use of carboxymethyl cellulose (CMC) as the organic substance. On this occasion, the degree of deterioration of the respective test pieces in both the soil burial test and the semicontinuous activated sludge method was approximately 50% after 300 days, and no change was observed until 100 days after.

EXAMPLE 8

A test piece (sheet) prepared by the use of a kneaded mixture consisting of 10% of polyethylene, 20% of a copolymer comprising polyethylene and vinyl acetate at the rate of 55:45, 65% of calcium sulfite and 5% of starch was tested for tensile strength. Said test piece was subjected to both semicontinuous activated sludge method and the soil burial test. As a result, in the former test, the tensile strength of the test piece showed lowering by 75% after 150 days after, while in the latter test, said strength showed lowering by 75% after 150 days and disintegration phenomenon took place after 400 days.

EXAMPLE 9

The same tests as in the preceding example were conducted by applying an ethylene-vinyl acetate copolymer at the ratio of 40:60. The speed of deterioration of the test piece in this case was practically the same as in the preceding example.

EXAMPLE 10

The same test as in Example 8 was conducted by substituting mannitol for the starch used in the composition of Example 8. The result was the same as that in the preceding example, but the degree of deterioration of the test piece was rather satisfactory compared with the case of starch.

EXAMPLE 11

Tests were conducted by the use of a test piece having the same composition as in Example 9 except for application of 5% of a starch processed with fat as the organic substance. As a result, the degree of deterioration of the tensile strength of the test piece in the case of the semicontinuous activated sludge method was 80% after 100 days after, and in the case of the soil burial test, said deterioration was approximately 90% after 400 days.

Further, when a series of tests were conducted in the same way as in the preceding two examples by applying mannitol, cellulose, CMC and lignin as the organic substance, respectively, the result was satisfactory in every case.

EXAMPLE 12

When a test was conducted by the use of a blend resin consisting of 55 parts by weight of polyethylene and 45 parts by weight of polyvinyl acetate in the same way as in the case of employing ethylene vinyl acetate copolymer, the result was also very satisfactory. As verified by the results in Examples 8 through 12, the presence of vinyl acetate, whether it constitutes a component of a copolymer or is present in the state of a polymer blend, is very useful for effecting deterioration of the strength of plastic moldings.

EXAMPLE 13

The same composition as in Example 1 was admixed with a foaming agent and subjected to compression foaming molding to obtain a test piece having a specific gravity of 0.5. When this test piece was buried, it deteriorated to the extent of being simply disintegrable by finger-pressure 200 after days.

In addition to the foregoing, many tests were conducted. For instance, a series of tests was conducted by modifying the amount of organic substance in the range of 3 to 10%. On this occasion, a modification in the range of 3 to 7% made no great difference in performance. When it was more than 7%, though the degree of deterioration was rather enhanced thereby, it was accompanied by the disadvantage that the object of the present invention could not be realized unless the amount of the inorganic substance was decreased, while in the case of less than 3%, especially about 1%, the deterioration effect showed a rapid lowering.

When a variety of tests were conducted by applying polypropylene as the resin, the results were the same as those in the foregoing examples. Application of such a resin as polystyrene also brought the same result as above.

The embodiments of the invention in which an exclusive property or privilege is claimed are defined as follows:

1. A synthetic resin molded object that is biologically disintegrable, made of a uniformly blended mixture consisting essentially of,
   A. from 1 to 10 percent by weight of fine particles of an organic substance that is decomposable by soil microorganisms or activated sludge microorganisms,
   B. from 40 to 90 percent by weight of particles of inorganic filler selected from the group consisting of diatomaceous earth, calcium carbonate, white carbon, talc, clay, calcium sulfate hemihydrate, anhydrous calcium sulfate and calcium sulfite, and
   C. the balance is synthetic resin selected from the group consisting of polyolefins and blends of polyolefins with polyvinyl acetate, the amount of said synthetic resin being effective to provide the structural integrity of the molded object.

2. A molded object as claimed in claim 1, in which (A) consists of carboxymethyl cellulose.

3. A molded object as claimed in claim 2, in which said polyolefin is selected from the group consisting of polyethylene, ethylene-vinyl acetate copolymer, polypropylene and ethylene-propylene copolymer.

4. A molded object as claimed in claim 2, in which the amount of carboxymethyl cellulose is from 3 to 8 percent by weight.

5. A molded object as claimed in claim 4, in which said resin comprises a blend of polyvinyl acetate and a polyolefin.

6. A molded object as claimed in claim 4, in which said resin comprises ethylene-vinyl acetate copolymer.

7. A molded object as claimed in claim 1, in which component (A) consists of at least one organic substance selected from the group consisting of starch, processed starch, mannitol, lactose, cellulose, lignin, carboxymethyl cellulose and casein.

* * * * *